July 26, 1960   J. P. BRUCK   2,946,358
SABER SAW
Filed Nov. 28, 1958
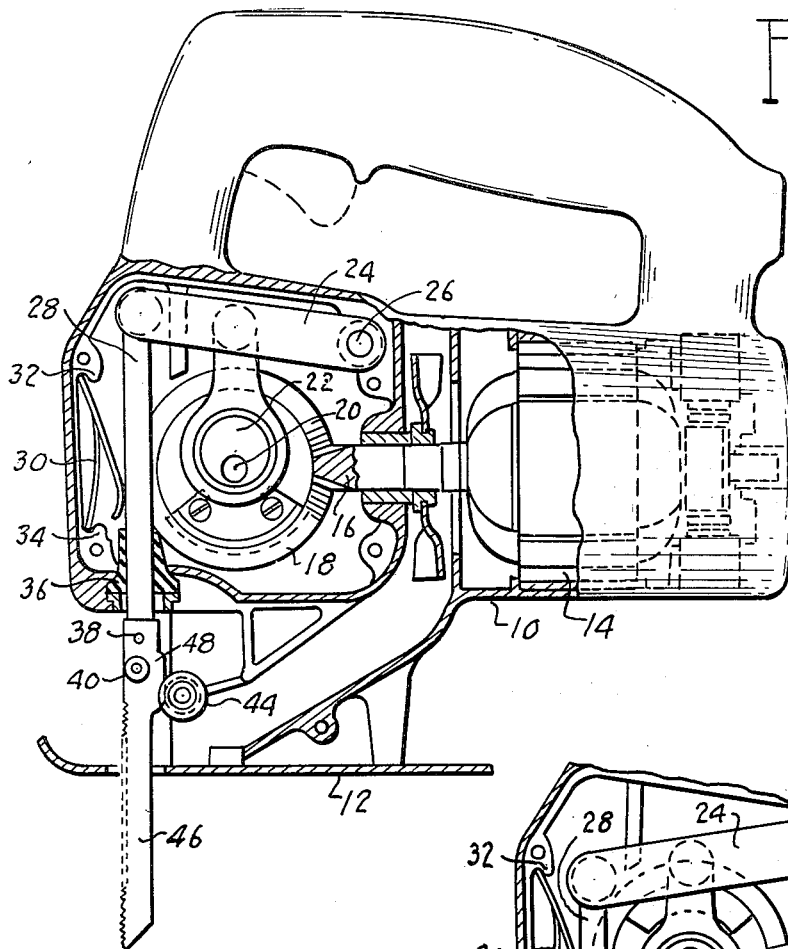
FIG.1.
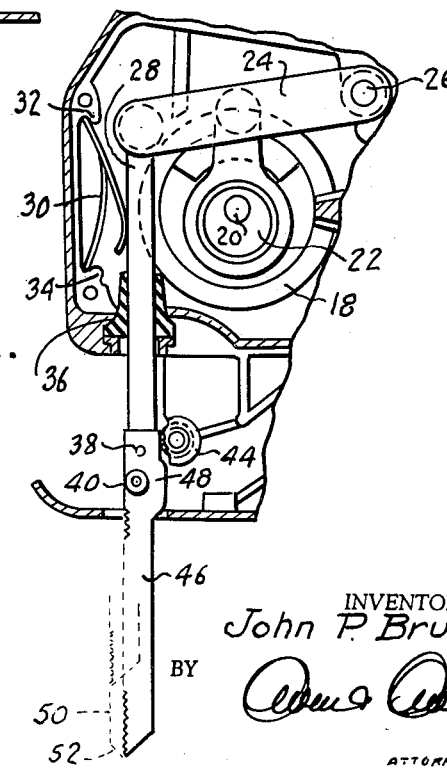
FIG.2.
INVENTOR.
John P. Bruck
BY
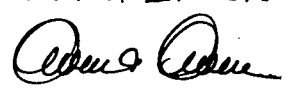
ATTORNEYS

United States Patent Office 2,946,358
Patented July 26, 1960

2,946,358
SABER SAW

John P. Bruck, Toledo, Ohio, assignor to American-Lincoln Corporation, Toledo, Ohio, a corporation of Ohio Filed Nov. 28, 1958, Ser. No. 777,093

2 Claims. (Cl. 143—68)

This invention relates to a manually portable power saw of the jigsaw or saber saw type and is particularly directed to a means to improve the operation of the saw when used with relatively thick work.

High speed saber or jigsaws are becoming increasingly popular for the reason that they are adaptable to nearly any wood cutting operation and can follow into very tight curves and corners or can be used to make a straight ripping or cross cut if desired. It is known that in cutting plywood or in ripping that a "relief" motion imparted to the saw blade will result in tearing of the wood fibers in the immediate region of the cut. Such a "relief" motion, however, is desirable for thick work for the reason that it gives the chips an opportunity to be expelled from the space between the saw teeth and for the reason that there is an impact of the teeth against the work at the commencement of the cutting stroke. A straight cut, however, is better for thin work and for thin plywood such as veneers.

At the present time saws are available which operate to give a straight cut, and other saws are available which operate to give an orbital movement to the blade resulting in a "relief" motion.

The present invention has for its primary object to provide a saw of the saber or jig type in which the operator can select the type of motion to be imparted to the saw blade so that the "relief" motion is available for such work as requires it and, merely by interchanging blades, a straight cut or motion can be imparted to the blade.

Another object of the invention is to provide a saber or jigsaw in which the motion of the blade can be selected by the operator without the necessity for mechanically modifying the saw itself.

Other objects and advantages of the invention will become apparent from the following detailed description of a preferred embodiment thereof, reference being had to the accompanying drawings, in which—

Fig. 1 is a central vertical sectional view of a saw embodying the present invention; and Fig. 2 is a fragmentary diagrammatic view showing the position of a blade tip moved to a relieved position.

Referring to the drawings, a saw according to the present invention comprises a frame or casing 10 having a work engaging foot piece 12 and enclosing the usual electric driving motor desginated generally 14. The motor imparts the reciprocatory motion to a saw blade by means of a bevel driving gear 16 meshing with a driven gear 18 which rotates on a shaft 20. An eccentric 22 is keyed to the shaft 20 and has an arm extending outwardly into pivotal engagement with a rocking lever 24 pivoted at 26 to a frame part at its rear end and to a reciprocating blade holder 28 at its forward end.

The blade holder 28 is urged in one direction by a spring 30 which may take any suitable form but which is shown in the drawings as comprising a leaf spring snapped into place in the frame 10 and engaging in slots formed by ears 32 and 34 of the frame.

The blade holder 28 extends outwardly of the casing through a flexible grommet 36 and at its lower end has two spaced pins 38 and 40 over which a saw blade can be snapped for frictional engagement with the blade holder 28. This manner of attachment of a detachable blade to the blade holder is known in the art and operators of saws of this type are familiar with it so that attachment and detachment of a blade can be very quickly and easily accomplished.

A guiding and anti-friction roller 42 is pivoted to the frame 10 on an axis 44. This guiding roller is preferably grooved about its circumference and the groove is aligned with the rear edge of a blade held by the blade holder 28.

The saw blade is designated 46. Blades of this general type are well known. A blade usually comprises a hardened steel blank having about ten teeth per inch, each tooth having a set of .002 to .004 inch. The blade is, usually, approximately .050 inch thick although thicker or thinner blades might, of course, be used.

The motion of the blade in nearly all of the commonly used saber saws is purely reciprocatory and linear and this motion is desirable for certain operations, such as cutting thin plywood without tearing the surface. The present invention provides a means whereby a linear reciprocatory motion may be used, or, at the selection of the operator, a relief motion may be imparted to the blade so that, at the limit of the stroke of the teeth, the teeth are withdrawn from the work to permit them to be cleared by the removal of chips, and to give an impact to the teeth upon the commencement of a cut. This increases greatly the rate at which thick work can be sawed.

To the end above described, blade 46 is provided with a laterally extending cam surface 48. The cam surface 48 is held in engagement with the blade guiding roller 42 the axis of which is fixed with respect to the frame of the saw. In the form of the invention shown in the drawings the blade is held against the guiding roller by the leaf spring 30 which bears against the blade holder. The forward position of the blade 46 will thus be determined by the portion of the cam surface that is engaged with the guiding roller 42 as the blade is reciprocated. The blade can thus be made to have any desired component of forward motion, or rearward relief, as it reciprocates, since the blade is attached to the blade holder 28 and this member pivots about its connection with the rocking lever 24. In the preferred form, the path of the tip of the blade 46 is rectilinear throughout most of its length as indicated at 50 in Fig. 2, with a curvilinear rearward component 52 at the lower end of the stroke. In the usual saw blade for saber saws, the cut is made during the upward stroke, and the downward stroke has little cutting effect but serves to clean up the slot. Chips collected in the saw teeth are removed at the lower end of the stroke so that the teeth are clean and empty when the cut is started and do not become loaded. Further, the impact of the teeth on the work during the first portion of the upward cutting movement greatly assists in cutting thick work. The curvilinear movement of the blade is caused, of course, by cam 48 running beyond the point of tangency with the guide roller 42. This position of the parts is indicated in Fig. 2. It will be apparent that this may be adjusted to take place at either or both ends of the stroke if desired and that any suitable cam configuration may be used.

Should the operator wish to cut with a constant rectilinear motion for cutting plywood or thin work without tearing, this can be accomplished simply by replacing the blade having the cam 48 with a straight blade of the usual form.

While the invention has been disclosed in conjunction with a specific form and disposition of the parts, it is susceptible of numerous modifications and changes which may be made without departing from the invention as defined in the appended claims.

What I claim is:

1. In a saber saw having a body and a reciprocating blade holder, the improvement comprising a blade guiding means on said body, a blade removably attached to said holder, said blade having a cutting edge and a back edge thereon, and a projection on the back edge of said blade cooperating with said guiding means, said projection forming a cam surface having a substantially flat portion for maintaining substantially linear motion of said reciprocating blade during a major portion of the stroke and a curved portion at an end of said flat portion extending to the back edge of said blade for imparting a curvilinear movement to said blade during at least a portion of its reciprocation by said blade holder.

2. The improvement defined in claim 1, and spring means urging said blade against said guiding means.

References Cited in the file of this patent

UNITED STATES PATENTS

| | | |
|---|---|---|
| 2,775,272 | Papworth | Dec. 25, 1956 |
| 2,781,800 | Papworth | Feb. 19, 1957 |

FOREIGN PATENTS

| | | |
|---|---|---|
| 778,019 | Great Britain | July 3, 1957 |